US012119590B2

(12) United States Patent
Trout et al.

(10) Patent No.: US 12,119,590 B2
(45) Date of Patent: Oct. 15, 2024

(54) DIRECT PLUG HERMAPHRODITIC ELECTRICAL CONNECTOR ASSEMBLIES

(71) Applicant: TE Connectivity Solutions GmbH, Schaffhausen (CH)

(72) Inventors: David Allison Trout, Lancaster, PA (US); Justin Dennis Pickel, Hummelstown, PA (US); Timothy Robert Minnick, Enola, PA (US); Chad William Morgan, Carneys Point, NJ (US); Jeffrey Byron McClinton, Harrisburg, PA (US); Michael Streckewald, Harrisburg, PA (US); Margaret Mahoney Fernandes, West Chester, PA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 343 days.

(21) Appl. No.: 17/751,732

(22) Filed: May 24, 2022

(65) Prior Publication Data

US 2023/0411910 A1 Dec. 21, 2023

(51) Int. Cl.

| | |
|---|---|
| ***H01R 13/6586*** | (2011.01) |
| ***H01R 13/28*** | (2006.01) |
| ***H01R 13/6597*** | (2011.01) |
| ***H01R 24/84*** | (2011.01) |
| ***H01R 107/00*** | (2006.01) |
| *H01R 13/6471* | (2011.01) |

(52) U.S. Cl.

CPC ......... *H01R 13/6586* (2013.01); *H01R 13/28* (2013.01); *H01R 13/6597* (2013.01); *H01R 13/6471* (2013.01); *H01R 24/84* (2013.01); *H01R 2107/00* (2013.01)

(58) Field of Classification Search

CPC combination set(s) only.
See application file for complete search history.

(56) References Cited

U.S. PATENT DOCUMENTS 4,708,660 A 11/1987 Claeys et al.
9,742,088 B1 * 8/2017 Pickel ................ H01R 13/6471

(Continued)

FOREIGN PATENT DOCUMENTS

EP 1396051 8/2006

OTHER PUBLICATIONS

Taiwanese Office Action with English translation thereof, dated Feb. 15, 2024 in Application No. 112118614, 12 pages.

(Continued)

*Primary Examiner* — Briggitte R. Hammond

(57) ABSTRACT

An electrical connector assembly includes a housing having a mating interface configured to be mated with a hermaphroditic mating electrical connector assembly. The housing includes an electrically conductive commoning member having contact openings. Wafer assemblies are coupled to the housing each having a leadframe, a wafer body holding the leadframe, and a ground frame providing electrical shielding for the leadframe. The signal contacts are terminated to cables. The ground shields are electrically connected to the commoning member. The mating ends of the signal contacts and the ground shields form a hermaphroditic mating interface for mating with the hermaphroditic mating electrical connector assembly.

20 Claims, 11 Drawing Sheets

(56) References Cited

U.S. PATENT DOCUMENTS

| | | | | |
|---|---|---|---|---|
| 10,868,392 | B2 * | 12/2020 | Rossman | H01R 13/6587 |
| 11,831,095 | B2 * | 11/2023 | Trout | H01R 12/721 |
| 2013/0273781 | A1 * | 10/2013 | Buck | H01R 13/6585 439/626 |

OTHER PUBLICATIONS

Extended European Search Report, European Application No. 23174416. 0-1201, European Filing Date Oct. 13, 2023.

* cited by examiner

DIRECT PLUG HERMAPHRODITIC ELECTRICAL CONNECTOR ASSEMBLIES

BACKGROUND OF THE INVENTION

The subject matter herein relates generally to electrical connectors for a communication system.

Communication systems use electrical connectors to electrically connect various components to allow data communication between the components. For example, electrical connectors may be directly mated together. The electrical connectors typically include a plug connector and a receptacle connector. The signal conductors of the two electrical connectors transition between the two connectors. For high-speed connectors, shielding is required, adding to the complexity of the connector designs. Typically, both connectors are designed differently, such as having different housings, different contacts, different shield structures, and the like. The design and manufacture of such systems are expensive because it requires tooling investments for two individual connector designs.

A need remains for a cost effective and reliable electrical connector for a direct plug systems.

BRIEF DESCRIPTION OF THE INVENTION

In one embodiment, an electrical connector assembly is provided and includes a housing having a mating interface configured to be mated with a hermaphroditic mating electrical connector assembly. The housing includes a commoning member having contact openings arranged in rows and columns. The commoning member is electrically conductive. The electrical connector assembly includes wafer assemblies coupled to the housing and arranged in a wafer stack. Each wafer assembly includes a leadframe, a wafer body holding the leadframe, and a ground frame coupled to the wafer body to provide electrical shielding for the leadframe. Each leadframe has signal contacts extending between mating ends and terminating ends. The signal contacts have main bodies between the mating ends and the terminating ends. The main bodies extend through the wafer bodies. The terminating ends extend from the wafer body for termination to a cable. The mating ends extend from the wafer body into the corresponding opening in the commoning member. The mating ends are presented at the mating interface of the housing for mating with mating signal contacts of the hermaphroditic mating electrical connector assembly. Each ground frame has a ground plate coupled to the wafer body and ground shields extending forward from the ground plate. The ground shields extend along the mating ends of the corresponding signal contacts to provide shielding for the mating ends along the mating interfaces. The ground shields extend into the corresponding openings in the commoning member to engage and electrically connect to the commoning member. The mating ends of the signal contacts and the ground shields form a hermaphroditic mating interface for mating with the hermaphroditic mating electrical connector assembly having a hermaphroditic mating interface identical to the hermaphroditic mating interface defined by the signal contacts and the ground shields. The mating ends of the signal contacts and the ground shields are contained within a first half of the corresponding opening in the commoning member. A second half of the corresponding opening is open to receive the mating signal contacts and mating ground shields of the hermaphroditic mating electrical connector assembly.

In another embodiment, an electrical connector assembly is provided and includes a housing having a mating interface configured to be mated with a hermaphroditic mating electrical connector assembly. The housing has a first side and a second side opposite the first side. The housing includes a commoning member having contact openings arranged in rows and columns. Each opening having a first half toward the first side and a second half toward the second side. The commoning member is electrically conductive. The electrical connector assembly includes wafer assemblies coupled to the housing and arranged in a wafer stack. Each wafer assembly includes a leadframe, a wafer body holding the leadframe, and a ground frame coupled to the wafer body to provide electrical shielding for the leadframe. Each leadframe has signal contacts extending between mating ends and terminating ends. The signal contacts have main bodies between the mating ends and the terminating ends. The main bodies extend through the wafer bodies. The terminating ends extend from the wafer body for termination to a cable. The mating ends extend from the wafer body into the corresponding opening in the commoning member. The mating ends are presented at the mating interface of the housing for mating with mating signal contacts of the hermaphroditic mating electrical connector assembly. Each ground frame has a ground plate coupled to the wafer body and ground shields extending forward from the ground plate. The ground shields extend along the mating ends of the corresponding signal contacts to provide shielding for the mating ends along the mating interfaces. The ground shields extend into the corresponding openings in the commoning member to engage and electrically connect to the commoning member. The mating ends of the signal contacts and the ground shields form a hermaphroditic mating interface for mating with the hermaphroditic mating electrical connector assembly having a hermaphroditic mating interface identical to the hermaphroditic mating interface defined by the signal contacts and the ground shields. The mating ends of the signal contacts and the ground shields in each column are alternatingly contained within the first and second halves of the corresponding openings in the commoning member.

In a further embodiment, a communication system is provided and includes a first electrical connector assembly having a first electrical connector and first cables terminated to the first electrical connector. The first electrical connector includes a first housing having a first commoning member including first contact openings arranged in rows and columns. The first commoning member is electrically conductive. The first electrical connector has first signal contacts and first ground shields providing electrical shielding for the first signal contacts at mating ends of the first signal contacts. The first signal contacts and the first ground shields extend into the corresponding first openings in the first commoning member. The communication system includes a second electrical connector assembly having a second electrical connector and second cables terminated to the second electrical connector. The second electrical connector includes a second housing having a second commoning member includes second contact openings arranged in rows and columns. The second commoning member is electrically conductive. The second electrical connector has second signal contacts and second ground shields providing electrical shielding for the second signal contacts at mating ends of the second signal contacts. The second signal contacts and the second ground shields extend into the corresponding second openings in the second commoning member. The first and second electrical connectors are identical to each other. The first and second electrical connectors each have a hermaphroditic mating interface defined by the first and second signal contacts and the first and second ground shields. The first signal contacts and the first ground shields are contained within first halves of the corresponding first and second openings. The second signal contacts and the second ground shields are contained within second halves of the corresponding first and second openings.

DETAILED DESCRIPTION OF THE INVENTION

Figure 1:
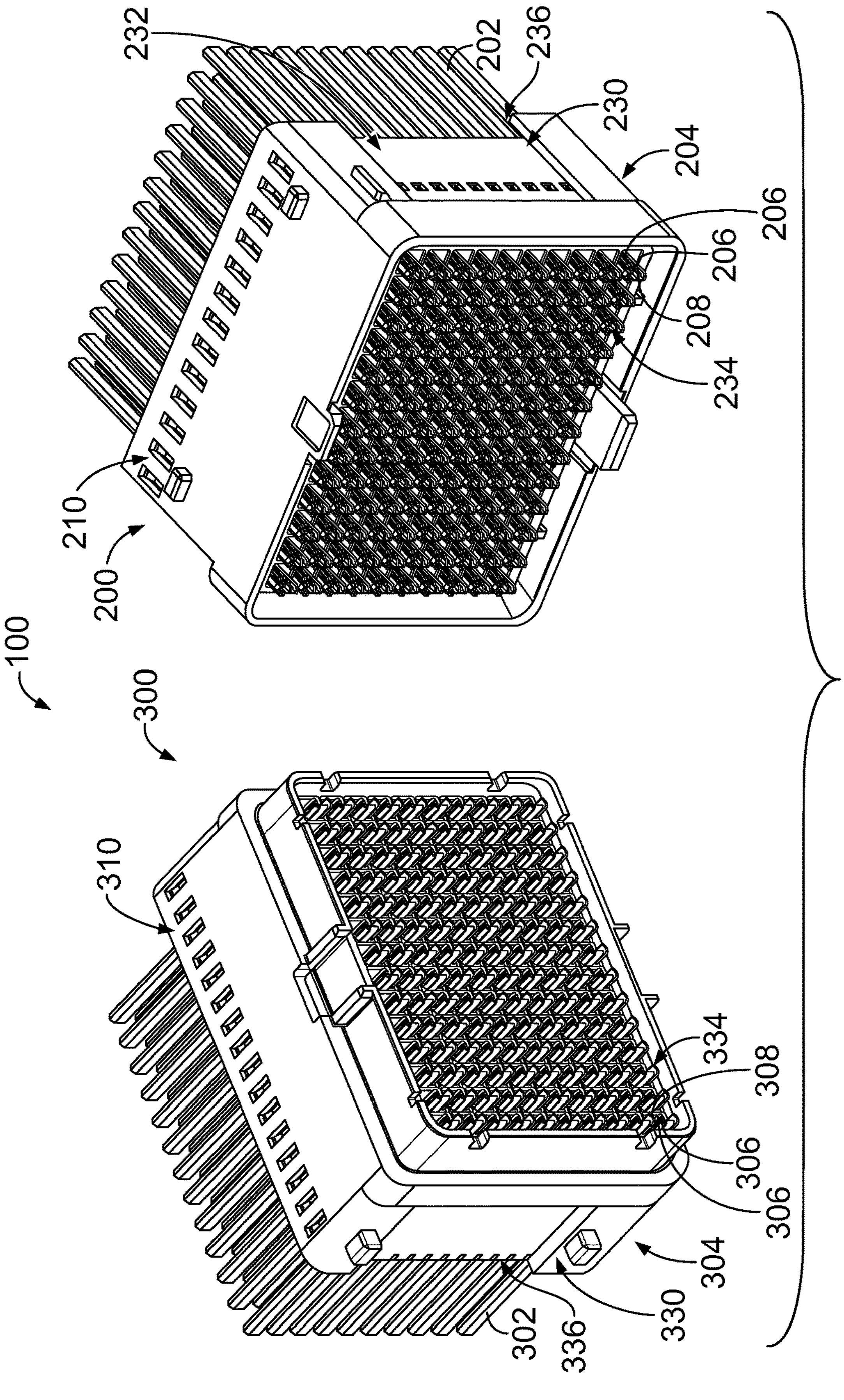
FIG. 1 illustrates a communication system in accordance with an exemplary embodiment.

FIG. 1 illustrates a communication system 100 in accordance with an exemplary embodiment. The communication system 100 includes a first electrical connector assembly 200 and the second electrical connector assembly 300 configured to be electrically coupled together. In various embodiments, the communication system 100 may be a server or network switch. In other various embodiments, the communication system 100 may be a backplane system. In various embodiments, the first and second electrical connector assemblies 200, 300 are cable connector assemblies. However, in alternative embodiments, the first electrical connector assembly 200 and/or the second electrical connector assembly 300 may be a circuit board connector mounted to a circuit board.

In an exemplary embodiment, the first and second electrical connector assemblies 200, 300 are directly mated together. For example, the first electrical connector assembly 200 may be plugged into the second electrical connector assembly 300 and/or the second electrical connector assembly 300 may be plugged into the first electrical connector assembly 200. The first and second electrical connector assemblies 200, 300 are mated at a separable mating interface. The first and second electrical connector assemblies 200, 300 are directly mated together without the use of an adapter or additional electrical connector therebetween.

The first electrical connector assembly 200 includes first cables 202 terminated to a first electrical connector 204. The first electrical connector 204 includes first signal contacts 206 and first ground shields 208 providing electrical shielding for the first signal contacts 206.

The second electrical connector assembly 300 includes second cables 302 terminated to a second electrical connector 304. The second electrical connector 304 includes second signal contacts 306 and second ground shields 308 providing electrical shielding for the second signal contacts 306.

The first and second electrical connectors 204, 304 have hermaphroditic mating interfaces defined, at least in part, by the signal contacts 206, 306 and the ground shields 208, 308. As such, the first and second electrical connectors 204, 304 are identical to each other allowing use of the same parts in both the first and second electrical connectors 204, 304. In an exemplary embodiment, the signal contacts 206, 306 are arranged in rows and columns. The first signal contacts 206 are arranged for direct mating with the second signal contacts 306 when the first and second electrical connectors 204, 304 are mated. The ground shields 208, 308 provide electrical shielding around the signal contacts 206, 306 at the mating interfaces between the signal contacts 206, 306. In an exemplary embodiment, the first signal contacts 206 and the first ground shields 208 are pluggable into the second electrical connector 304. The second signal contacts 306 and the second ground shields 308 are pluggable into the first electrical connector 204. The communication system 100 is a direct plug communication system.

The signal contacts 206, 306 define electrical paths between the cables 202, 302. The signal contacts 206, 306 mate at a separable mating interface between the first and second electrical connectors 204, 304. For example, the mating interfaces of the signal contacts 206, 306 are arranged along mating planes (for example, parallel to the columns). In various embodiments, the first signal contacts 206 are arranged in pairs and the second signal contacts 306 are arranged in pairs. The ground shields 208, 308 cooperate to provide shielding for the corresponding signal contacts 206, 306 (for example, pairs of the signal contacts 206, 306). In an exemplary embodiment, the ground shields 208, 308 provide 360° shielding for the corresponding signal contacts 206, 306. The ground shields 208, 308 may be electrically connected to cable shields of the cables 202, 302 to continue shielding along the signal paths between the cables 202, 302. The ground shields 208, 308 may be electrically connected to shielding structures passing through the electrical connectors 204, 304.

The first electrical connector 204 includes a housing 210 having a mating interface configured to be mated with the second electrical connector 304. The mating interface is provided at a front of the housing 210. In an exemplary embodiment, the first electrical connector 204 includes a plurality of wafers assemblies 230 coupled to the housing 210. The wafer assemblies 230 include the signal contacts 206 and the ground shields 208. The cables 202 are configured to be terminated to corresponding wafer assemblies 230. For example, the wafer assemblies 230 may support the cables 202 and signal conductors of the cables 202 are soldered or otherwise terminated to corresponding signal contacts 206. In an exemplary embodiment, the wafer assemblies 230 are oriented vertically. However, other orientations are possible in alternative embodiments. Each wafer assembly 230 includes a corresponding column of the signal contacts 206. The wafer assemblies 230 are stacked in the housing 210 to arrange the signal contacts 206 in rows.

In an exemplary embodiment, the wafer assemblies 230 are arranged in a wafer stack 232. For example, the wafer assemblies 230 are parallel to each other in the wafer stack 232. The wafer stack 232 extends from a rear of the housing 210. Optionally, the wafer assemblies 230 may be individually loaded into the housing 210, such as into a cavity at a rear of the housing 210. Alternatively, the wafer assemblies 230 may be assembled together in the wafer stack 232 and the wafer stack 232 is loaded into the rear of the housing 210.

In an exemplary embodiment, each wafer assembly 230 extends between a mating end 234 and a terminating end 236. The cables 202 are terminated to the wafer assembly 230 at the terminating end 236. The mating end 234 extends into the housing 210 and is configured to be mated with the second electrical connector 304. In various embodiments, the wafer assembly 230 may be a right-angle wafer assembly having the mating end 234 at a right angle relative to the terminating end 236. The ground shields 208 are provided at the mating end 234 and are configured to be mated with the second electrical connector 304.

The second electrical connector 304 includes a housing 310 having a mating interface configured to be mated with the first electrical connector 204. The mating interface is provided at a front of the housing 310. In an exemplary embodiment, the second electrical connector 304 includes a plurality of wafer assemblies 330 coupled to the housing 310. The wafer assemblies 330 include the signal contacts 306 and the ground shields 308. The cables 302 are terminated to the corresponding wafer assemblies 330. For example, conductors of the cables 302 may be soldered or welded to the signal contacts 306. In an exemplary embodiment, the wafer assemblies 330 are vertically. However, other orientations are possible in alternative embodiments. Each wafer assembly 330 includes a corresponding column of the signal contacts 306. The wafer assemblies 330 are stacked in the housing 310 to arrange the signal contacts 306 in rows.

In an exemplary embodiment, the wafer assemblies 330 are arranged in a wafer stack 332. For example, the wafer assemblies 330 are parallel to each other in the wafer stack 332. The wafer stack 332 extends from a rear of the housing 310. Optionally, the wafer assemblies 330 may be individually loaded into the housing 310, such as into a cavity at a rear of the housing 310. Alternatively, the wafer assemblies 330 may be assembled together in the wafer stack 332 and the wafer stack 332 is loaded into the rear of the housing 310.

In an exemplary embodiment, each wafer assembly 330 extends between a mating end 334 and a terminating end 336. The cables 302 are terminated to the wafer assembly 330 at the terminating end 336. The mating end 334 extends into the housing 310 is configured to be mated with the first electrical connector 204. In various embodiments, the wafer assembly 330 may be a right-angle wafer assembly having the mating end 334 at a right angle relative to the terminating end 336. The ground shields 308 are provided at the mating end 334 and are configured to be mated with the first electrical connector 204.

Figure 2:
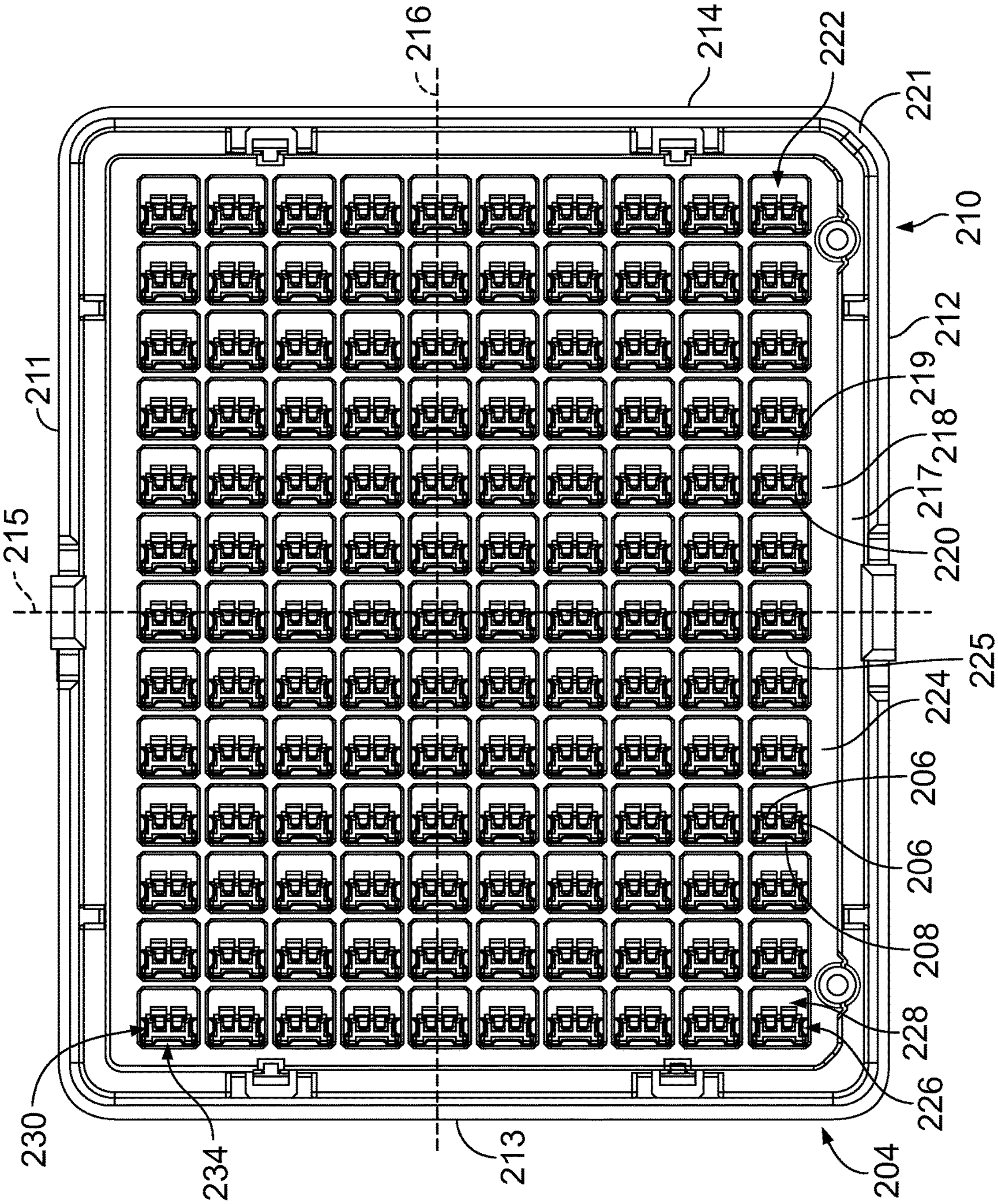
FIG. 2 is a front view of the first electrical connector assembly in accordance with an exemplary embodiment showing the mating interface.

FIG. 2 is a front view of the first electrical connector assembly 200 in accordance with an exemplary embodiment showing the mating interface. The second electrical connector assembly 300 (FIG. 1) may have an identical mating interface. The housing 210 holds the signal contacts 206 and the ground shields 208 for mating with the second electrical connector 304 (shown in FIG. 1). The housing 210 forms part of the mating interface with the second electrical connector 304.

The housing 210 has a top 211 and a bottom 212. The housing 210 is a first side 213 and a second side 214 opposite the first side 213. The housing 210 has a primary axis 215 extending from top 211 to bottom 212 and a secondary axis 216 extending from the first side 213 to the second side 214. The secondary axis 216 is perpendicular to the primary axis 215. In an exemplary embodiment, the signal contacts 206 and the ground shields 208 are arranged in columns parallel to the primary axis 215 and rows parallel to the secondary axis 216. The mating ends 234 are arranged along mating planes parallel to the primary axis 215 for interfacing with the second contacts 306 (FIG. 1). The wafer assemblies 230 are received in the housing 210 such that the wafer assemblies 230 are oriented parallel to the primary axis 215.

In an exemplary embodiment, the housing 210 is a multi-piece housing including a contact organizer 217 and a commoning member 218. The commoning member 218 is at the front of the housing 210. The contact organizer 217 may include locating features for locating the commoning member 218 relative to the contact organizer 217. In an exemplary embodiment, the commoning member 218 faces the second electrical connector 304. The commoning member 218 is electrically conductive and is used to electrically common each of the ground shields 208. The commoning member 218 provides electrical shielding for the signal contacts 206 at the mating interface. The commoning member 218 provides mating surfaces for the grounding beams of the ground shields 308.

In an exemplary embodiment, the contact organizer 217 includes a base 219, an outer shroud 221 surrounding a cavity, and a plurality of towers 220 in the cavity extending forward from the base 219. The towers 220 support the signal contacts 206 and the ground shields 208. In an exemplary embodiment, the towers 220 extend into openings 222 in the commoning member 218. The towers 220 may pass entirely through the openings 222 and extend forward of the front of the commoning member 218. The towers 220 are configured to be received in corresponding openings in a commoning member of the second electrical connector 304. In an exemplary embodiment, the towers 220 are rectangular shaped; however, the towers 220 may have other shapes in alternative embodiments.

The wafer assemblies 230 are coupled to the housing 210 rearward of the base 219. The signal contacts 206 and the ground shields 208 pass through the base 219 to extend along the towers 220. The signal contacts 206 are electrically isolated from each other and from the ground shields 208 by the dielectric material of the towers 220.

The commoning member 218 is manufactured from a conductive material. For example, the commoning member 218 may be a metal block having the openings 222 formed therethrough. In alternative embodiments, the commoning member 218 may be manufactured from a conductive plastic. In other various embodiments, the commoning member 218 may be a plated plastic structure having plating at the front 224 and/or through the openings 222 and/or at the rear. The ground shields 208 are configured to be electrically connected to the commoning member 218. For example, the ground shields 208 may engage the commoning member 218 within the openings 222.

In an exemplary embodiment, the openings 222 pass entirely through the commoning member 218 and are defined by walls 225. In an exemplary embodiment, the openings 222 are rectangular. In the illustrated embodiment, the openings 222 are square shaped. However, the openings 222 may have other shapes. In an exemplary embodiment, the openings 222 are oversized relative to the towers 220. For example, each opening 222 may be sized to receive two of the towers 220 (one from the first electrical connector 204 and one from the second electrical connector 304). Each opening 222 includes a first half 226 and a second half 228. The first half 226 receives the corresponding tower 220, signal contacts 206 and ground shield 208 of the first electrical connector 204. The second half 228 receives the corresponding tower, signal contacts and ground shield of the second electrical connector 304. Optionally, the first halves 226 may all be on first sides/left sides of all of the openings 222 and the second halves 228 may all be on second sides/right sides of all of the openings 222. However, in alternative embodiments, some of the first halves 226 are on first sides/left sides of the openings 222 and some of the second halves 228 are on second sides/right sides of the openings 222. For example, the first halves 226 and the second halves 228 may alternate between the left side/right side of the openings 222 within the columns and/or the rows such that the corresponding towers 220, signal contacts 206 and ground shields 208 alternate sides within the columns and/or the rows.

Figure 3:
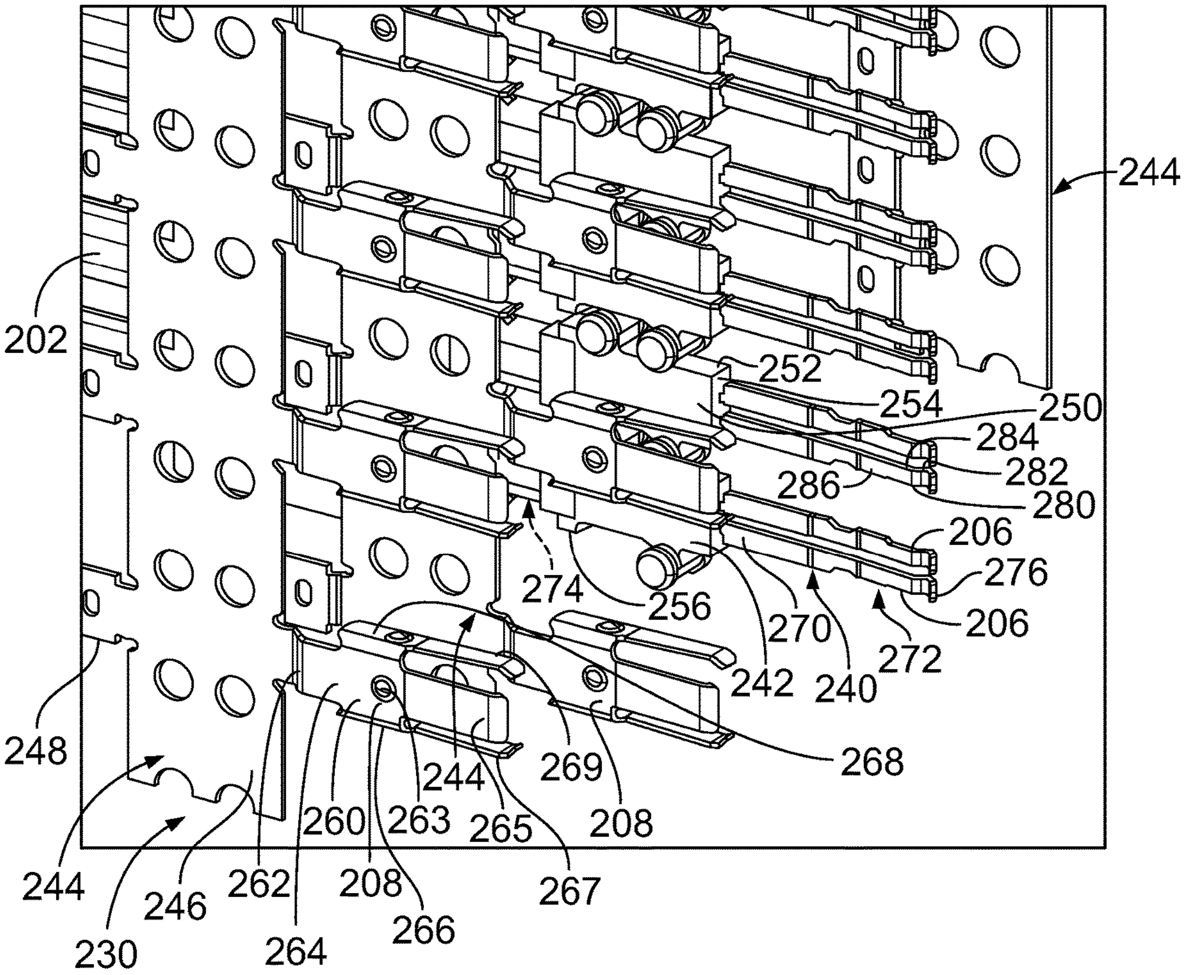
FIG. 3 is an exploded view of a portion of the wafer assembly in accordance with an exemplary embodiment.
Figure 4:
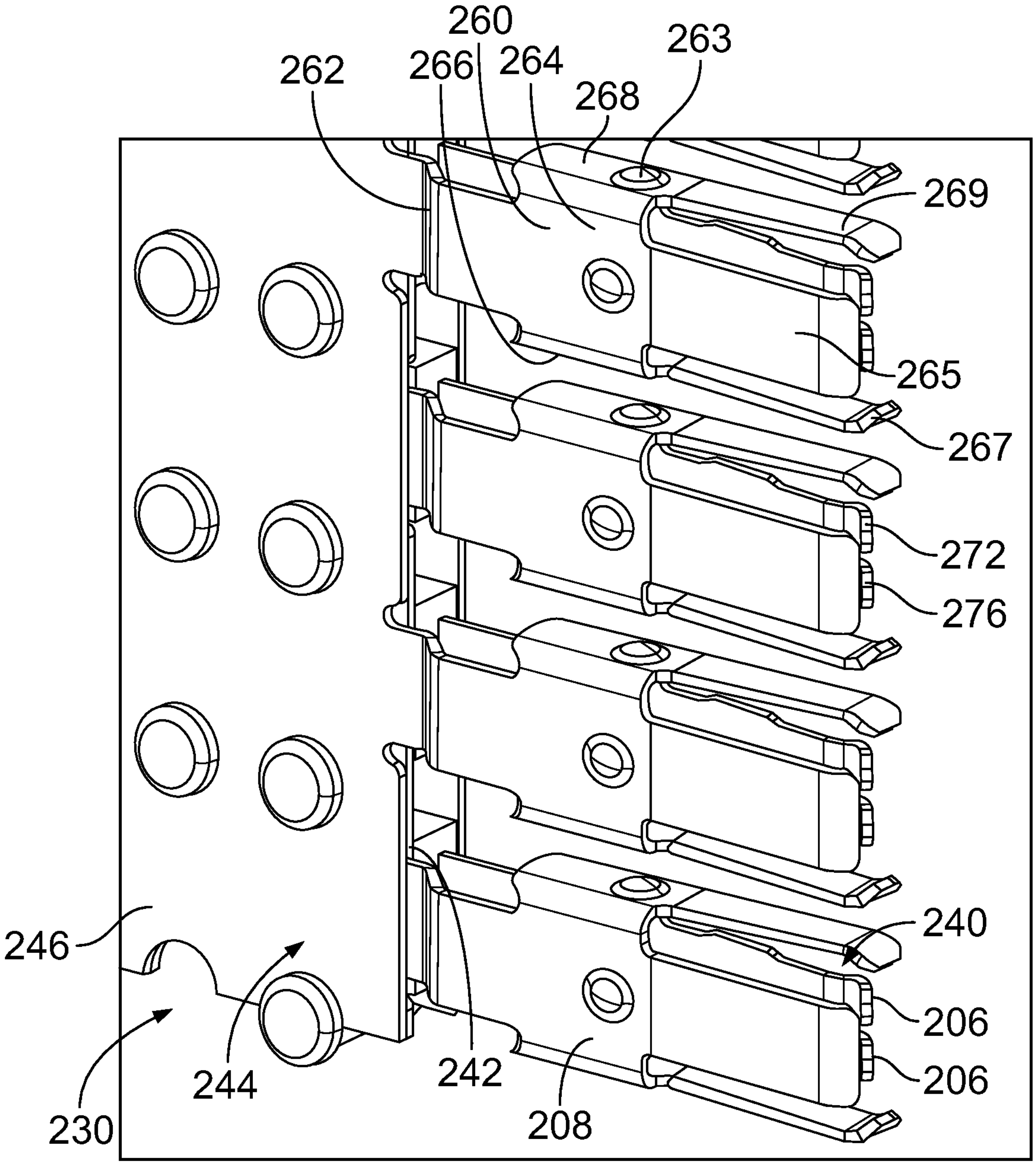
FIG. 4 is a perspective, assembled view of the wafer assembly in accordance with an exemplary embodiment.

FIG. 3 is an exploded view of a portion of the wafer assembly 230 in accordance with an exemplary embodiment. FIG. 4 is a perspective, assembled view of the wafer assembly 230 in accordance with an exemplary embodiment. In an exemplary embodiment, the wafer assembly 230 is identical to the wafer assembly 330 (shown in FIG. 1) with both wafer assemblies 230, 330 including identical components.

The wafer assembly 230 includes a lead frame 240, a wafer body 242 holding the lead frame 240, and at least one ground frame 244 coupled to the wafer body 242 to provide electrical shielding for the lead frame 240. In the illustrated embodiment, the wafer assembly 230 includes multiple ground frames 244. The lead frame 240 includes the signal contacts 206. The lead frame 240 may be stamped and formed from a metal sheet. In an exemplary embodiment, the lead frame 240 only includes the signal contacts 206. However, in alternative embodiments, the lead frame 240 may include ground contacts arranged between corresponding signal contacts to provide electrical shielding for the signal contacts. In an exemplary embodiment, the signal contacts 206 are arranged in pairs configured to carry differential signals. However, the signal contacts 206 may be single ended signal contacts in alternative embodiments.

The wafer body 242 surrounds the signal contacts 206 and positions the signal contacts 206 relative to each other. In an exemplary embodiment, the wafer body 242 is manufactured from a dielectric material, such as a plastic material. In an exemplary embodiment, the wafer body 242 is an overmold that is overmolded around the lead frame 240. The wafer body 242 includes sides 250, 252. The wafer body 242 includes a front 254 and a rear 256 extending between a top and a bottom. The front 254 defines a mating end. The signal contacts 206 extend from the wafer body 242 at the front 254 for connection to the second electrical connector 304 (shown in FIG. 1). The rear 256 defines a cable end. The cables 202 extend from the rear 256 along cable axes.

Each signal contact 206 includes a contact body 270 extending between a mating end 272 and a terminating end 274. The contact body 270 extends along a contact axis. Optionally, the contact axis is parallel to the corresponding cable axis. In an exemplary embodiment, the contact body 270 is stamped and formed as part of the lead frame 240. When stamped, the contact body 270 has first and second edges 280, 282 extending between first and second sides 284, 286. The edges 280, 282 are the cut edges made during the stamping process. The sides 284, 286 are the main, opposed surfaces of the metal sheet from which the signal contact 206 is stamped. One of the sides 284, 286 defines a mating interface configured to interface with the corresponding signal contact 306 of the second electrical connector 304. The contact bodies 270 of the lead frame 240 are generally arranged in a lead frame plane parallel to the sides 250, 252 of the wafer body 242. The signal contact 206 includes a spring beam 276 at the mating end 272. The spring beam 276 is deflectable and configured to be mated with a corresponding spring beam of the second signal contact 306 (shown in FIG. 1). In various embodiments, the spring beam 276 is generally aligned with the main portion of the contact body 270. In an exemplary embodiment, the signal contact 206 includes a solder pad at the terminating end 274 for soldering or welding to the corresponding signal conductor of the cable 202.

Each ground frame 244 provides a shield structure for the signal contacts 206. In an exemplary embodiment, the ground frame 244 includes a ground plate 246 forming a main body of the ground frame 244. The ground shields 208 extend from the front of the ground plate 246. In an exemplary embodiment, cable tabs 248 extend from a rear of the ground plate 246 for connection to cable shields of the cables 202. The ground plate 246 is configured to be coupled to the side of the wafer body 242, such as the first side 250 and/or the second side 252. In an exemplary embodiment, the ground plate 246 is generally planar. The ground frame 244 includes openings or other mounting features for mounting the ground frame 244 to the wafer body 242.

Each ground shield 208 includes a shield portion 260 and a transition portion 262 between the shield portion 260 and the ground plate 246. The shield portion 260 provides electrical shielding along the mating ends 272 of the signal contacts 206. The transition portion 262 may include one or more bends to position the shield portion 260 relative to the ground plate 246.

In the illustrated embodiment, the shield portion 260 of the ground shield 208 is C-shaped. The shield portion 260 includes an end wall 264 and side walls 266, 268 extending from the end wall 264. The transition portion 262 is connected to the end wall 264. In an exemplary embodiment, the shield portion 260 is stamped such that the end wall 264 includes one or more ground fingers 265 and such that the side walls 266, 268 include one or more ground fingers 267, 269, respectively. The ground fingers 265, 267, 269 include mating interfaces. For example, the ground fingers 265, 267, 269 may be cupped or include bumps near distal ends of the ground fingers 265, 267, 269. The ground fingers 265, 267, 269 are deflectable. Optionally, the end wall 264 and/or the side walls 266, 268 may include dimples 263. The ground fingers 265, 267, 269 extend along the mating ends 272 of the signal contacts 206.

When assembled, as shown in FIG. 4, the ground plate(s) 246 extend along the wafer body 242. The ground shields 208 extend forward of the wafer body 242 to extend along the mating ends 272 of the signal contacts 206. The shield portions 260 of the ground shields 208 provide shielding for the corresponding pair of signal contacts 206. The ground shields 208 are C-shaped and surround three sides of the pair of signal contacts 206. The ground fingers 265 have generally uniform spacing from the spring beams 276 of the pair. The ground fingers 267, 269 of the side walls 266, 268 are spaced generally uniformly from the respective (closest) signal contact 206. The ground shields 208 provide efficient electrical shielding for both signal contacts 206 of the corresponding pair.

Figure 5:
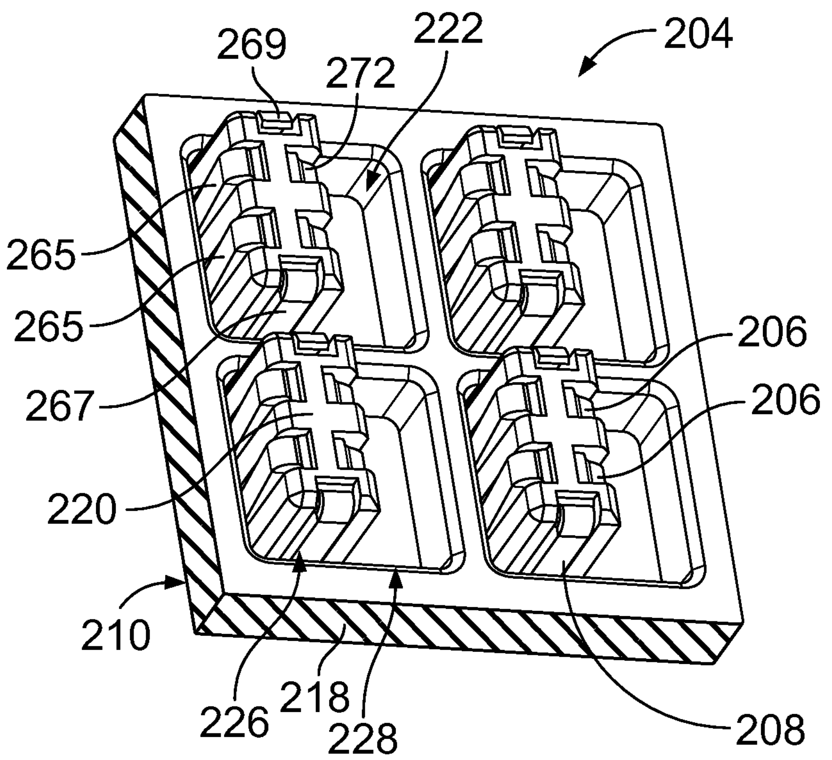
FIG. 5 is a front perspective view of a portion of the first electrical connector in accordance with an exemplary embodiment.

FIG. 5 is a front perspective view of a portion of the first electrical connector 204 in accordance with an exemplary embodiment and illustrates the housing 210 holding a plurality of the signal contacts 206 and the ground shields 208. FIG. 5 shows the commoning member 218 at the front of the housing 210 with the openings 222. The towers 220, the signal contacts 206, and the ground shields 208 pass through the openings 222. The commoning member 218 provides electrical shielding for the signal contacts 206 at the mating interface. The ground shields 208 are configured to be electrically connected to the commoning member 218. The commoning member 218 electrically commons all of the ground shields 208.

The signal contacts 206 and the ground shields 208 extend along the towers 220 and pass through the commoning member 218. In an exemplary embodiment, the mating ends 272 are electrically isolated from each other and from the ground shields 208 by the dielectric material of the towers 220. The ground fingers 265, 267, 269 provide shielding along the mating ends 272. The towers 220, the signal contacts 206, and the ground shields 208 are located within the first half 226 of the corresponding opening 222. The second half 228 is open to receive the hermaphroditic towers, signal contacts and ground shields of the second electrical connector 304.

Figure 6:
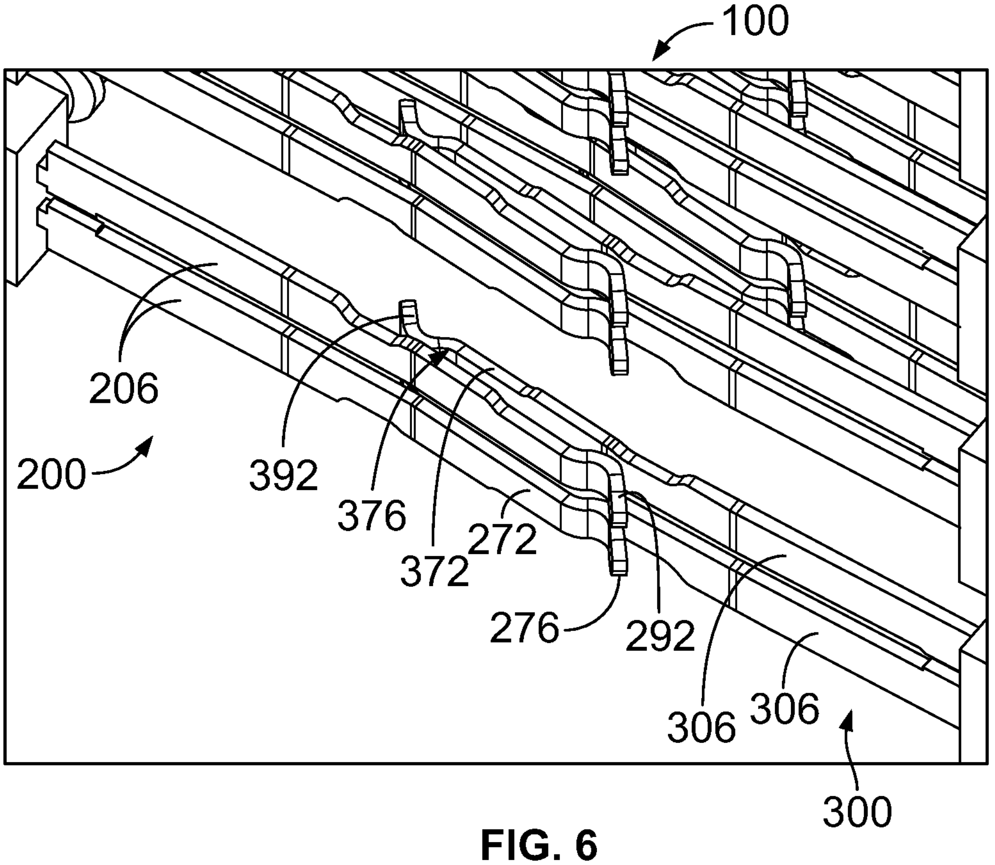
FIG. 6 illustrates a portion of the communication system in accordance with an exemplary embodiment showing the mating interface between the hermaphroditic first and second electrical connector assemblies.

FIG. 6 illustrates a portion of the communication system 100 in accordance with an exemplary embodiment showing the mating interface between the hermaphroditic first and second electrical connector assemblies 200, 300. FIG. 6 shows the first and second signal contacts 206, 306 mated to each other along a separable mating interface between the electrical connector assemblies 200, 300. The housings and the ground shields are removed to illustrate the signal contacts 206, 306.

The signal contacts 206 include mating fingers 292 at the tips of the mating ends 272. Similarly, the signal contacts 306 include mating fingers 392 at the tips of mating ends 372 of the second signal contacts 306. When mated, the mating fingers 292 engage spring beams 376 of the second signal contacts 306 and the mating fingers 392 engage the spring beams 276 of the first signal contacts 206. The signal contacts 206, 306 have multiple points of contact with each other. The multiple points of contact along the length of the signal contacts 206, 306 reduce electrical stubs. The electrical stubs lengths are limited to the tips of the signal contacts 206, 306 and beyond the points of contact.

Figure 7:
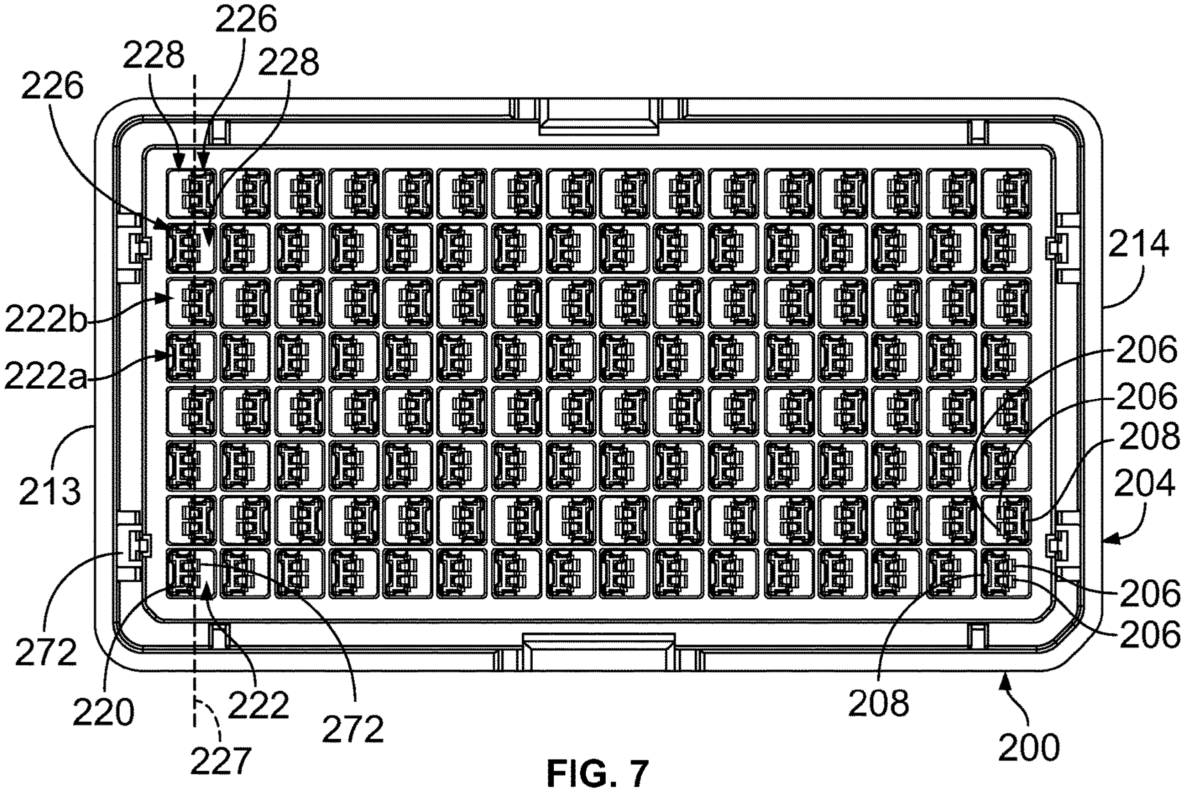
FIG. 7 is a front view of the first electrical connector assembly in accordance with an exemplary embodiment showing the mating interface.
Figure 8:
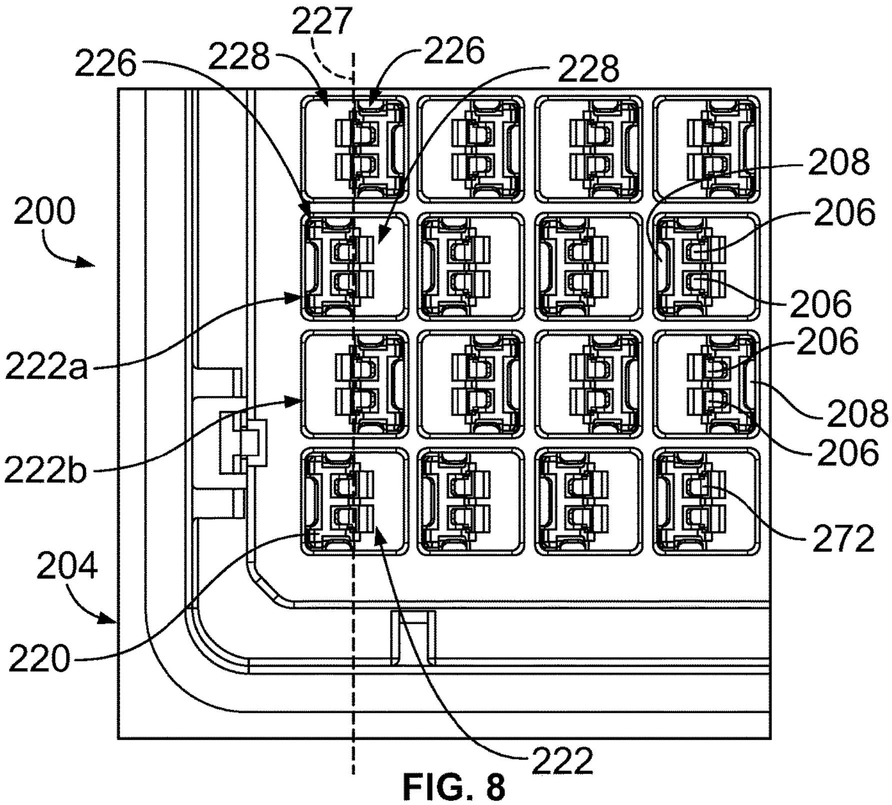
FIG. 8 is a front view of a portion of the first electrical connector assembly in accordance with an exemplary embodiment showing the mating interface.

FIG. 7 is a front view of the first electrical connector assembly 200 in accordance with an exemplary embodiment showing the mating interface. FIG. 8 is a front view of a portion of the first electrical connector assembly 200 in accordance with an exemplary embodiment showing the mating interface. In the illustrated embodiment, the first electrical connector assembly 200 is rectangular including fewer rows of openings 222 (and corresponding towers 220, signal contacts 206, and ground shields 208) than columns of openings 222 (and corresponding towers 220, signal contacts 206, and ground shields 208).

In an exemplary embodiment, the towers 220, the signal contacts 206 and the ground shields 208 of the first electrical connector 204 are received in the first halves 226 of the openings 222. The second halves 228 are open to receive the towers, the signal contacts, and the ground shields of the second electrical connector 304 (shown in FIG. 1). In the illustrated embodiment, the first and second halves 226, 228 alternate on opposite sides of the openings 222. For example, the first and second halves 226, 228 alternate within each column and/or within each row. The openings 222 include a first subset of openings 222*a* having the first halves 226 closer to the first side 213 of the housing 210 and the second halves 228 closer to the second side 214 of the housing 210. The openings 222 include a second subset of openings 222*b* having the first halves 226 closer to the second side 214 of the housing 210 and the second halves 228 closer to the first side 213 of the housing 210. The first halves 226 and the second halves 228 alternate between the left side/right side of the openings 222 within the columns and/or the rows such that the corresponding towers 220, signal contacts 206 and ground shields 208 alternate sides within the columns and/or the rows. Alternating the signal contacts 206 and the ground shields 208 in the openings 222 reduces mating forces by cancelling mating forces (for example, half of the mating forces are in a right direction and half of the mating forces are in a left direction). In an exemplary embodiment, the mating interfaces of the mating ends 272 of the signal contacts 206 are arranged along centerlines 227 of the openings 222 between the first and second halves 226, 228 for mating with the mating ends of the signal contacts 306 (shown in FIG. 1).

Figure 9:
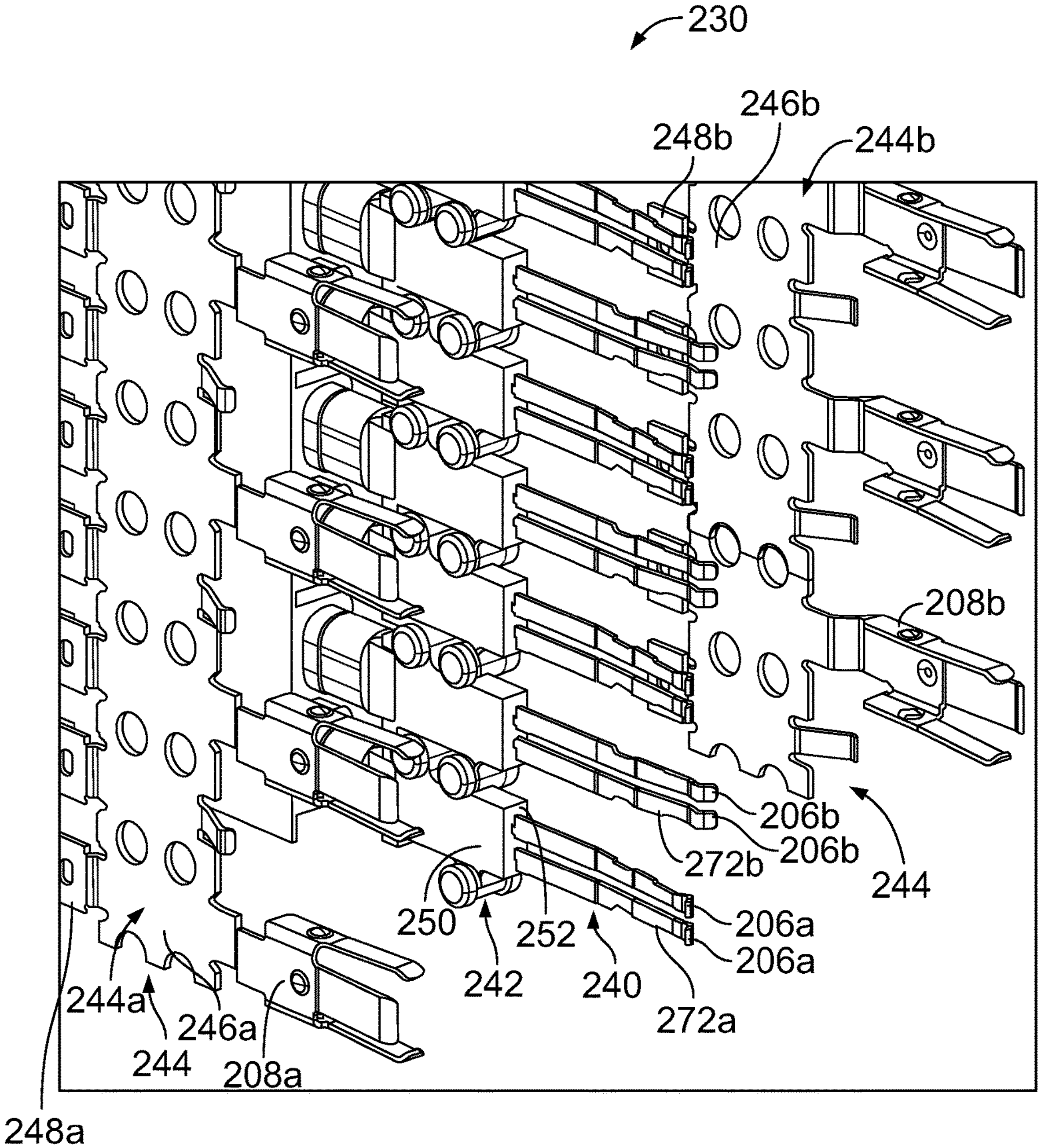
FIG. 9 is an exploded view of a portion of the wafer assembly in accordance with an exemplary embodiment for use in the electrical connector assembly shown in FIGS. 7 and 8.
Figure 10:
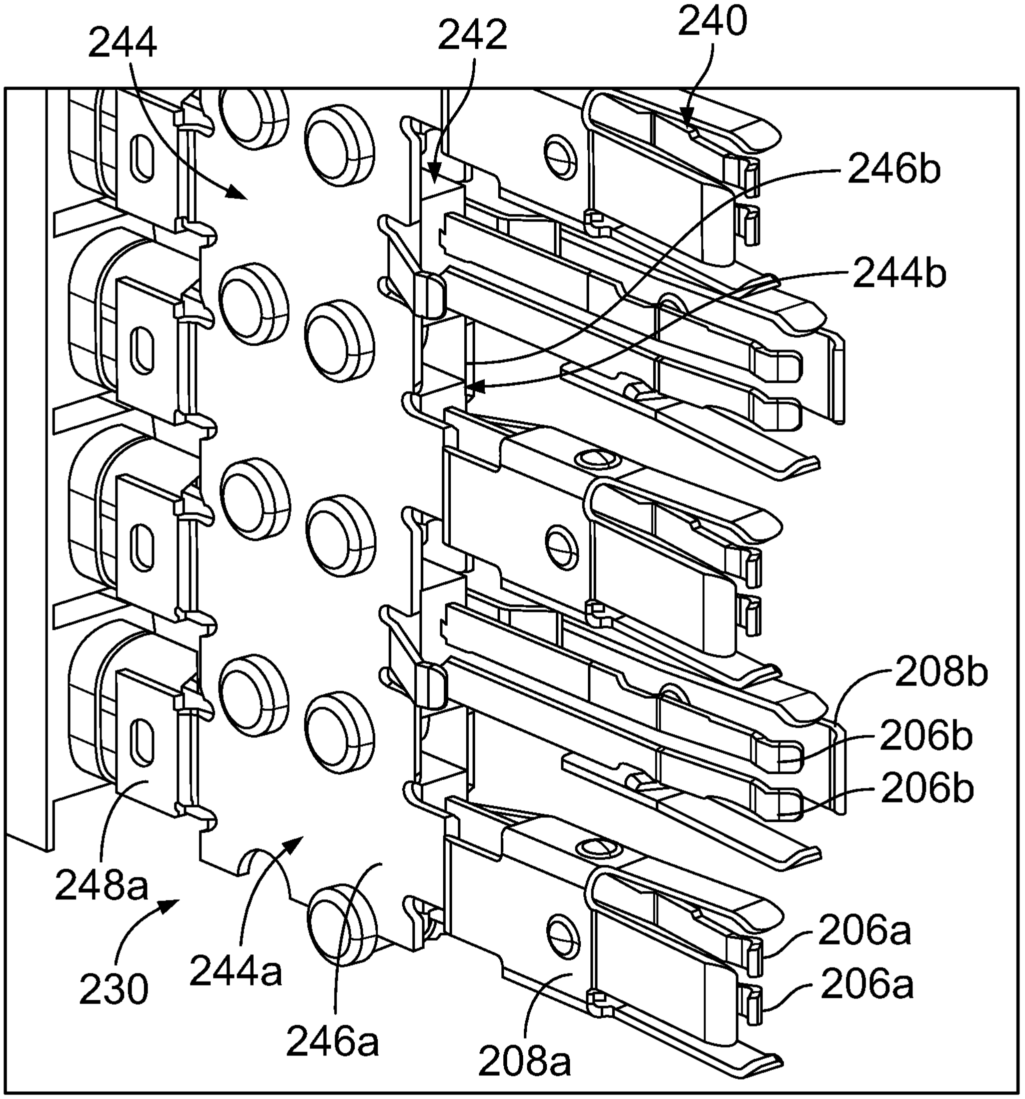
FIG. 10 is a perspective, assembled view of the wafer assembly in accordance with an exemplary embodiment for use in the electrical connector assembly shown in FIGS. 7 and 8.

FIG. 9 is an exploded view of a portion of the wafer assembly 230 in accordance with an exemplary embodiment for use in the electrical connector assembly 200 shown in FIGS. 7 and 8. FIG. 10 is a perspective, assembled view of the wafer assembly 230 in accordance with an exemplary embodiment for use in the electrical connector assembly 200 shown in FIGS. 7 and 8. In an exemplary embodiment, the wafer assembly 230 is identical to the wafer assembly 330 of the second electrical connector assembly 300 with both wafer assemblies 230, 330 including identical components.

The wafer assembly 230 includes the lead frame 240, the wafer body 242 holding the lead frame 240, and the ground frames 244 coupled to the wafer body 242 to provide electrical shielding for the lead frame 240. In the illustrated embodiment, the wafer assembly 230 includes multiple ground frames 244*a*, 244*b* coupled to opposite sides of the wafer body 242. The signal contacts 206 are arranged in pairs. In the illustrated embodiment, the pairs of signal contacts 206*a*, 206*b* face in opposite directions. For example, the mating ends 272*a*, 272*b* of the signal contacts 206*a*, 206*b* alternately face in the right direction and then the left direction.

Each ground frame 244*a*, 244*b* includes the corresponding ground plate 246*a*, 246*b* and corresponding ground shields 208*a*, 208*b*. Optionally, the cable tabs 248*a*, 248*b* extend from the rear of each ground plate 246*a*, 246*b*, respectively. The ground plates 246*a*, 246*b* are coupled to the sides 250, 252 of the wafer body 242. The ground shields 208*a*, 208*b* are staggered to cover different pairs of the signal contacts 206*a*, 206*b*, respectively.

Figure 11:
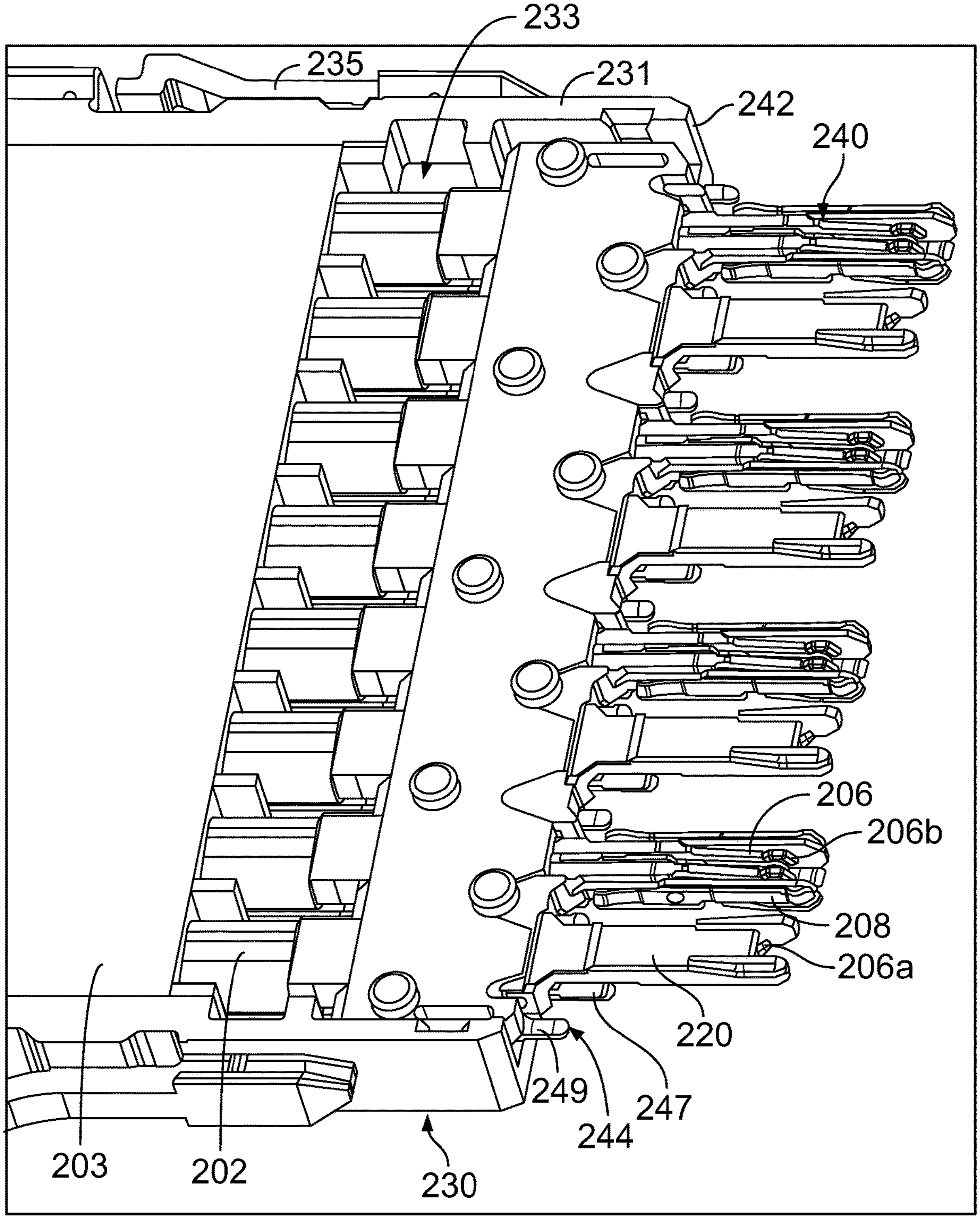
FIG. 11 is a perspective, assembled view of the wafer assembly in accordance with an exemplary embodiment for use in the electrical connector assembly.
Figure 12:
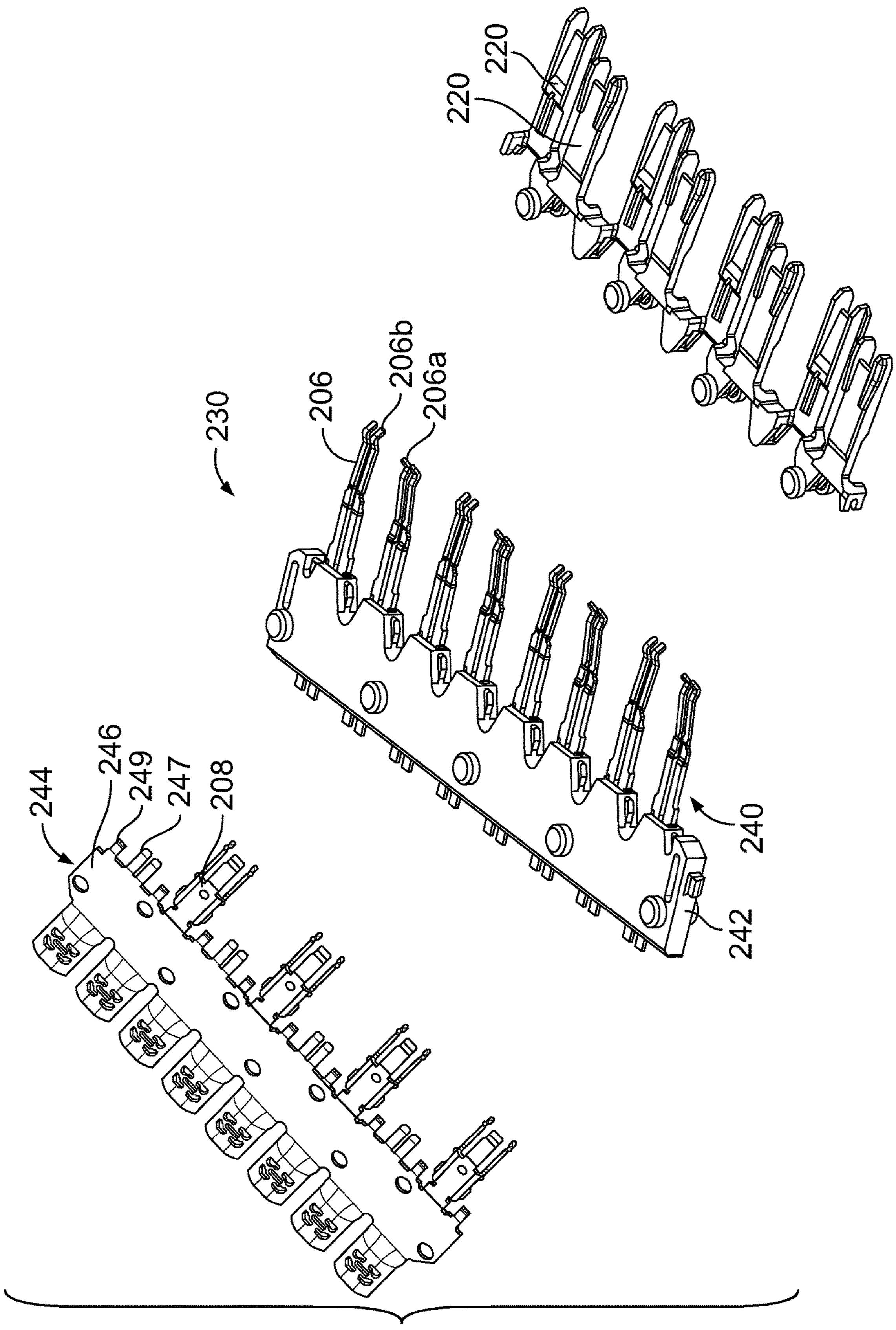
FIG. 12 is an exploded view of a portion of the wafer assembly shown in FIG. 11 in accordance with an exemplary embodiment.

FIG. 11 is a perspective, assembled view of the wafer assembly 230 in accordance with an exemplary embodiment for use in the electrical connector assembly 200. FIG. 12 is an exploded view of a portion of the wafer assembly 230 shown in FIG. 11. In an exemplary embodiment, the wafer assembly 230 is identical to the wafer assembly 330 of the second electrical connector assembly 300 with both wafer assemblies 230, 330 including identical components.

The wafer assembly 230 includes the lead frame 240, the wafer body 242 holding the lead frame 240, and one or more ground frames 244 (only one ground frame shown in FIGS. 11 and 12 but a second ground frame may be included on the opposite side of the wafer assembly 230). The ground frames 244 are coupled to the wafer body 242 to provide electrical shielding for the lead frame 240. The signal contacts 206 are arranged in pairs. In the illustrated embodiment, the pairs of signal contacts 206*a*, 206*b* face in opposite directions.

In an exemplary embodiment, the wafer assembly 230 includes a wafer frame 231 having a cavity 233. The wafer body 242 and the cables 202 are received in the cavity 233. The wafer frame 231 is used to secure the wafer assembly 230 in the housing 210 (shown in FIG. 1). The wafer frame 231 includes latches 235 to latchably secure the wafer frame 231 in the housing 210. In an exemplary embodiment, the wafer assembly 230 includes a cable holder 203 holding the cables 202. The cable holder 203 is received in the cavity 233. In various embodiments, the cable holder 203 is an overmolded body that is overmolded over the cables 202. The cable holder 203 may be formed in place on the cables 202. The cable holder 203 may be formed in place in the cavity 233.

In an exemplary embodiment, the wafer assembly 230 includes the towers 220, rather than having the towers 220 formed as parts of the contact organizer 217 (shown in FIG. 1) of the housing 210 (shown in FIG. 2). The towers 220 are separate and discrete from the wafer body 242. For example, the towers 220 are discrete pieces coupled to the front end of the wafer body 242. However, in alternative embodiments, the towers 220 are formed integral with the wafer body 242. For example, the towers 220 may be co-molded with the wafer body 242. The signal contacts 206 extend along a first side of the corresponding tower 220 and the ground shield 208 extends along a second side of the corresponding tower 220. The towers 220 locate the ground shields 208 relative to the signal contacts 206. In the illustrated embodiment, the signal contacts 206 are alternatingly arranged on the right and left sides of the towers 220 and the ground shields 208 are alternatingly arranged on the left and right sides of the towers 220.

In an exemplary embodiment, the ground frame 244 includes connecting fingers 247, 249 extending forward from the ground plate 246, such as between the ground shields 208. The connecting fingers 247, 249 are configured to interface with the commoning member 218 of the housing 210. The connecting fingers 247, 249 have different lengths to engage different portions of the commoning member 218.

Figure 13:
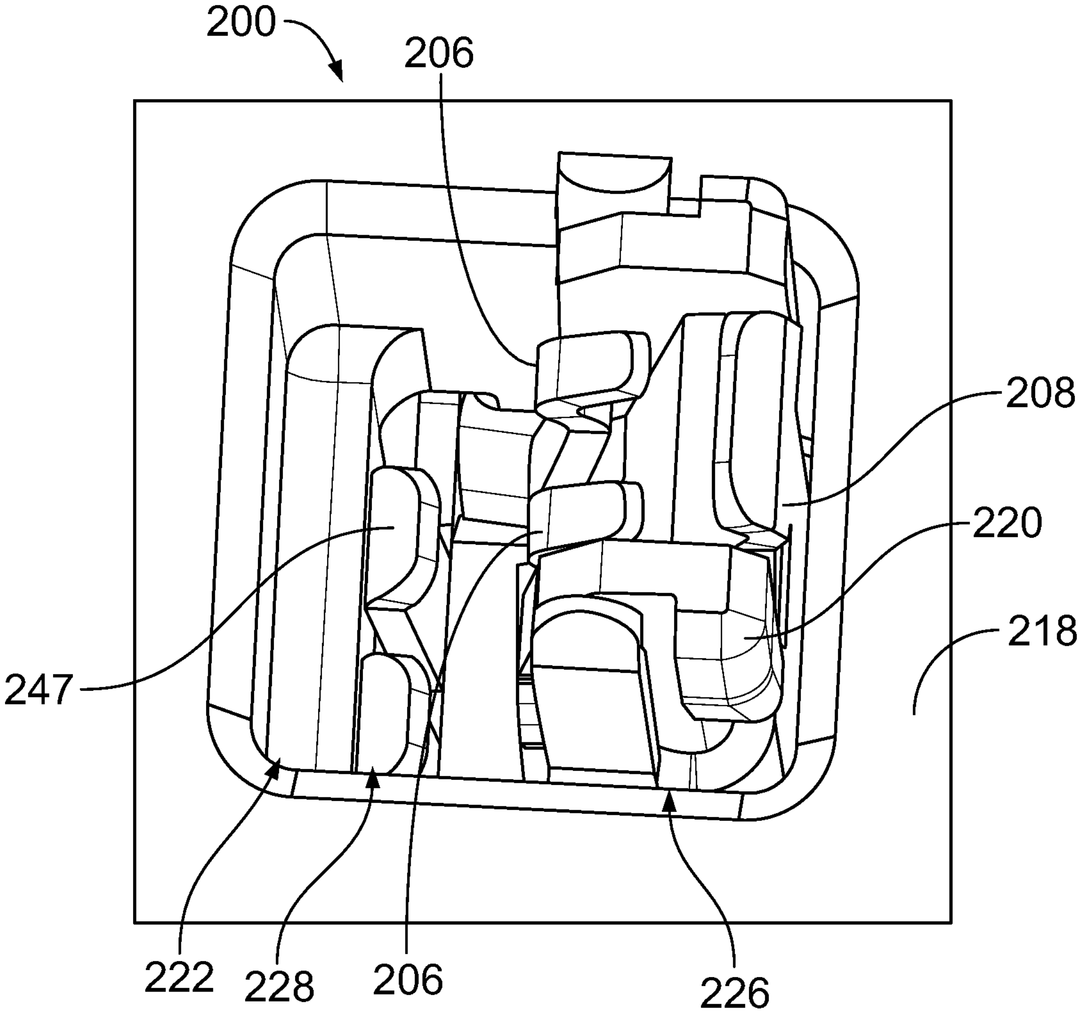
FIG. 13 is a front perspective view of a portion of the first electrical connector assembly in accordance with an exemplary embodiment.

FIG. 13 is a front perspective view of a portion of the first electrical connector assembly 200. FIG. 13 shows one of the openings 222 in the commoning member 218 and the corresponding tower 220 supporting the signal contacts 206 and the ground shield 208. The tower 220 passes entirely through the opening 222 forward of the front of the commoning member 218 in the first half 226. The second half 228 is open to receive the tower, the second signal contacts and the second ground shield of the second electrical connector assembly 300. The tower 220 supports the signal contacts 206 and the ground shield 208. The ground shield 208 is electrically connected to the commoning member 218. The connecting fingers 247, 249 (shown in FIGS. 11 and 12) may be coupled to the rear of the commoning member 218.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector assembly comprising:

a housing having a mating interface configured to be mated with a hermaphroditic mating electrical connector assembly, the housing including a commoning member having contact openings arranged in rows and columns, the commoning member being electrically conductive; and wafer assemblies coupled to the housing and arranged in a wafer stack, each wafer assembly including a leadframe, a wafer body holding the leadframe, and a ground frame coupled to the wafer body to provide electrical shielding for the leadframe;

each leadframe having signal contacts extending between mating ends and terminating ends, the signal contacts having main bodies between the mating ends and the terminating ends, the main bodies extending through the wafer bodies, the terminating ends extending from the wafer body for termination to a cable, the mating ends extending from the wafer body into the corresponding opening in the commoning member, the mating ends presented at the mating interface of the housing for mating with mating signal contacts of the hermaphroditic mating electrical connector assembly; and each ground frame having a ground plate coupled to the wafer body and ground shields extending forward from the ground plate, the ground shields extending along the mating ends of the corresponding signal contacts to provide shielding for the mating ends along the mating interfaces, the ground shields extending into the corresponding openings in the commoning member to engage and electrically connect to the commoning member;

wherein the mating ends of the signal contacts and the ground shields form a hermaphroditic mating interface for mating with the hermaphroditic mating electrical connector assembly having a hermaphroditic mating interface identical to the hermaphroditic mating interface defined by the signal contacts and the ground shields; and wherein the mating ends of the signal contacts and the ground shields are contained within a first half of the corresponding opening in the commoning member, and wherein a second half of the corresponding opening is open to receive the mating signal contacts and mating ground shields of the hermaphroditic mating electrical connector assembly.

2. The electrical connector assembly of claim 1, wherein the mating ends of the signal contacts within each wafer assembly are coplanar.

3. The electrical connector assembly of claim 1, wherein the signal contacts are arranged in pairs, the mating ends of adjacent pairs facing in opposite directions.

4. The electrical connector assembly of claim 1, wherein the mating ends of the signal contacts and the ground shields extending into contact openings of a commoning member of the hermaphroditic mating electrical connector assembly.

5. The electrical connector assembly of claim 1, wherein each ground frame includes cable tabs extending from the ground plate for connection to the cables.

6. The electrical connector assembly of claim 1, wherein the housing includes a first side and a second side opposite the first side, each opening including a first half toward the first side and a second half toward the second side, wherein the mating ends of the signal contacts and the ground shields in each column are alternatingly contained within the first and second halves of the corresponding openings in the commoning member.

7. The electrical connector assembly of claim 1, wherein each ground frame includes first ground fingers extending from the ground plate and each ground shield includes second ground fingers, the first ground fingers engaging the commoning member to electrically connect the ground frame to the commoning member, the second ground fingers configured to engage a commoning member of the hermaphroditic mating electrical connector assembly to electrically connect the ground frame to the commoning member of the hermaphroditic mating electrical connector assembly.

8. The electrical connector assembly of claim 1, wherein the wafer body includes a rear body holding the main bodies of the signal contacts and a front body supporting the mating ends of the signal contacts.

9. The electrical connector assembly of claim 8, wherein the ground shields are coupled to the front body, the ground shields including ground fingers extending along exterior surfaces of the front body.

10. The electrical connector assembly of claim 1, wherein the wafer body includes contact towers supporting the mating ends of the signal contacts.

11. The electrical connector assembly of claim 10, wherein the contact towers include first contact towers and second contact towers, the first contact towers facing in a first direction, the second contact towers facing in a second direction opposite the first direction, the first contact towers interspersed with the second contact towers.

12. An electrical connector assembly comprising:

a housing having a mating interface configured to be mated with a hermaphroditic mating electrical connector assembly, the housing having a first side and a second side opposite the first side, the housing including a commoning member having contact openings arranged in rows and columns, each opening having a first half toward the first side and a second half toward the second side, the commoning member being electrically conductive; and wafer assemblies coupled to the housing and arranged in a wafer stack, each wafer assembly including a leadframe, a wafer body holding the leadframe, and a ground frame coupled to the wafer body to provide electrical shielding for the leadframe;

each leadframe having signal contacts extending between mating ends and terminating ends, the signal contacts having main bodies between the mating ends and the terminating ends, the main bodies extending through the wafer bodies, the terminating ends extending from the wafer body for termination to a cable, the mating ends extending from the wafer body into the corresponding opening in the commoning member, the mating ends presented at the mating interface of the housing for mating with mating signal contacts of the hermaphroditic mating electrical connector assembly; and each ground frame having a ground plate coupled to the wafer body and ground shields extending forward from the ground plate, the ground shields extending along the mating ends of the corresponding signal contacts to provide shielding for the mating ends along the mating interfaces, the ground shields extending into the corresponding openings in the commoning member to engage and electrically connect to the commoning member;

wherein the mating ends of the signal contacts and the ground shields form a hermaphroditic mating interface for mating with the hermaphroditic mating electrical connector assembly having a hermaphroditic mating interface identical to the hermaphroditic mating interface defined by the signal contacts and the ground shields; and wherein the mating ends of the signal contacts and the ground shields in each column are alternatingly contained within the first and second halves of the corresponding openings in the commoning member.

13. The electrical connector assembly of claim 12, wherein the mating ends of the signal contacts within each wafer assembly are coplanar.

14. The electrical connector assembly of claim 12, wherein the signal contacts are arranged in pairs, the mating ends of adjacent pairs facing in opposite directions.

15. The electrical connector assembly of claim 12, wherein the mating ends of the signal contacts and the ground shields extend into contact openings of a commoning member of the hermaphroditic mating electrical connector assembly.

16. The electrical connector assembly of claim 12, wherein each ground frame includes first ground fingers extending from the ground plate and each ground shield includes second ground fingers, the first ground fingers engaging the commoning member to electrically connect the ground frame to the commoning member, the second ground fingers configured to engage a commoning member of the hermaphroditic mating electrical connector assembly to electrically connect the ground frame to the commoning member of the hermaphroditic mating electrical connector assembly.

17. The electrical connector assembly of claim 12, wherein the wafer body includes a rear body holding the main bodies of the signal contacts and a front body supporting the mating ends of the signal contacts, the ground shields being coupled to the front body, the ground shields including ground fingers extending along exterior surfaces of the front body.

18. The electrical connector assembly of claim 12, wherein the wafer body includes contact towers supporting the mating ends of the signal contacts, the contact towers including first contact towers and second contact towers, the first contact towers facing in a first direction, the second contact towers facing in a second direction opposite the first direction, the first contact towers interspersed with the second contact towers.

19. A communication system comprising:

a first electrical connector assembly having a first electrical connector and first cables terminated to the first electrical connector, the first electrical connector including a first housing having a first commoning member including first contact openings arranged in rows and columns, the first commoning member being electrically conductive, the first electrical connector having first signal contacts and first ground shields providing electrical shielding for the first signal contacts at mating ends of the first signal contacts, the first signal contacts and the first ground shields extending into the corresponding first openings in the first commoning member; and a second electrical connector assembly having a second electrical connector and second cables terminated to the second electrical connector, the second electrical connector including a second housing having a second commoning member including second contact openings arranged in rows and columns, the second commoning member being electrically conductive, the second electrical connector having second signal contacts and second ground shields providing electrical shielding for the second signal contacts at mating ends of the second signal contacts, the second signal contacts and the second ground shields extending into the corresponding second openings in the second commoning member;

wherein the first and second electrical connectors are identical to each other each having a hermaphroditic mating interface defined by the first and second signal contacts and the first and second ground shields;

wherein the first signal contacts and the first ground shields are contained within first halves of the corresponding first and second openings, and wherein the second signal contacts and the second ground shields are contained within second halves of the corresponding first and second openings.

20. The communication system of claim 19, wherein the first and second halves within columns of the first and second openings are alternatingly arranged on different sides of the corresponding first and second openings.

* * * * *